June 14, 1927.
F. W. HAKE
DERRICK CRANE
Filed Jan. 12, 1925
1,632,329
4 Sheets-Sheet 2
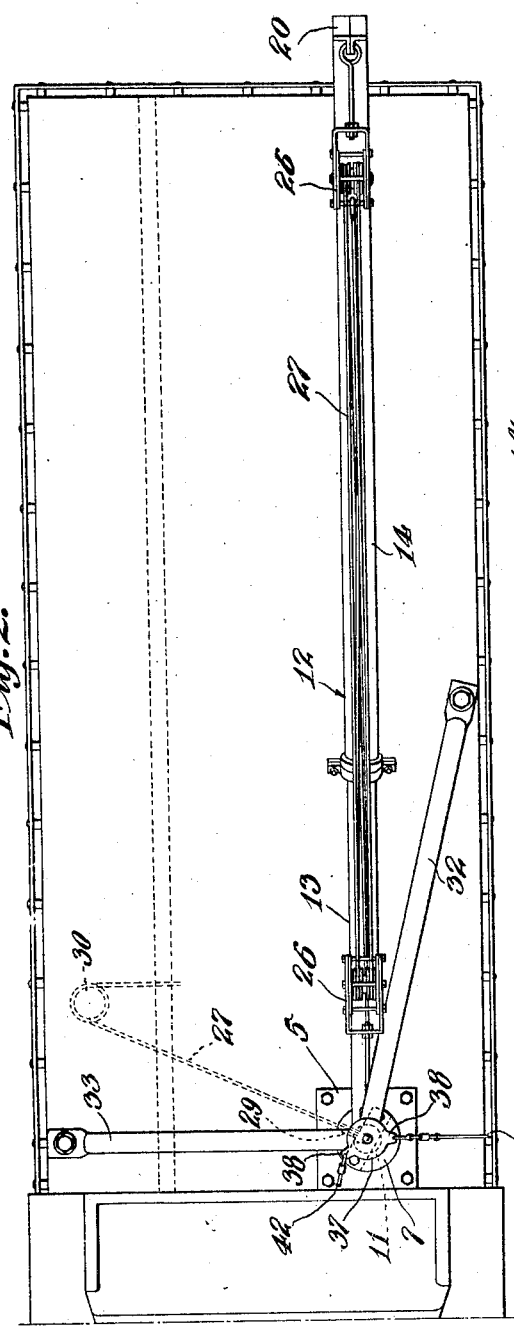
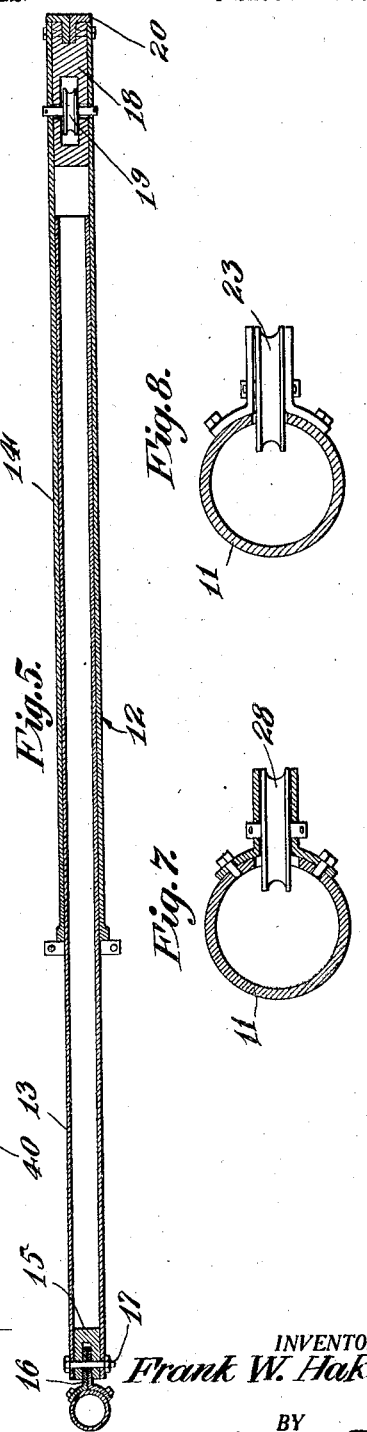
INVENTOR
Frank W. Hake
BY
Joshua R. H. Potts
HIS ATTORNEY

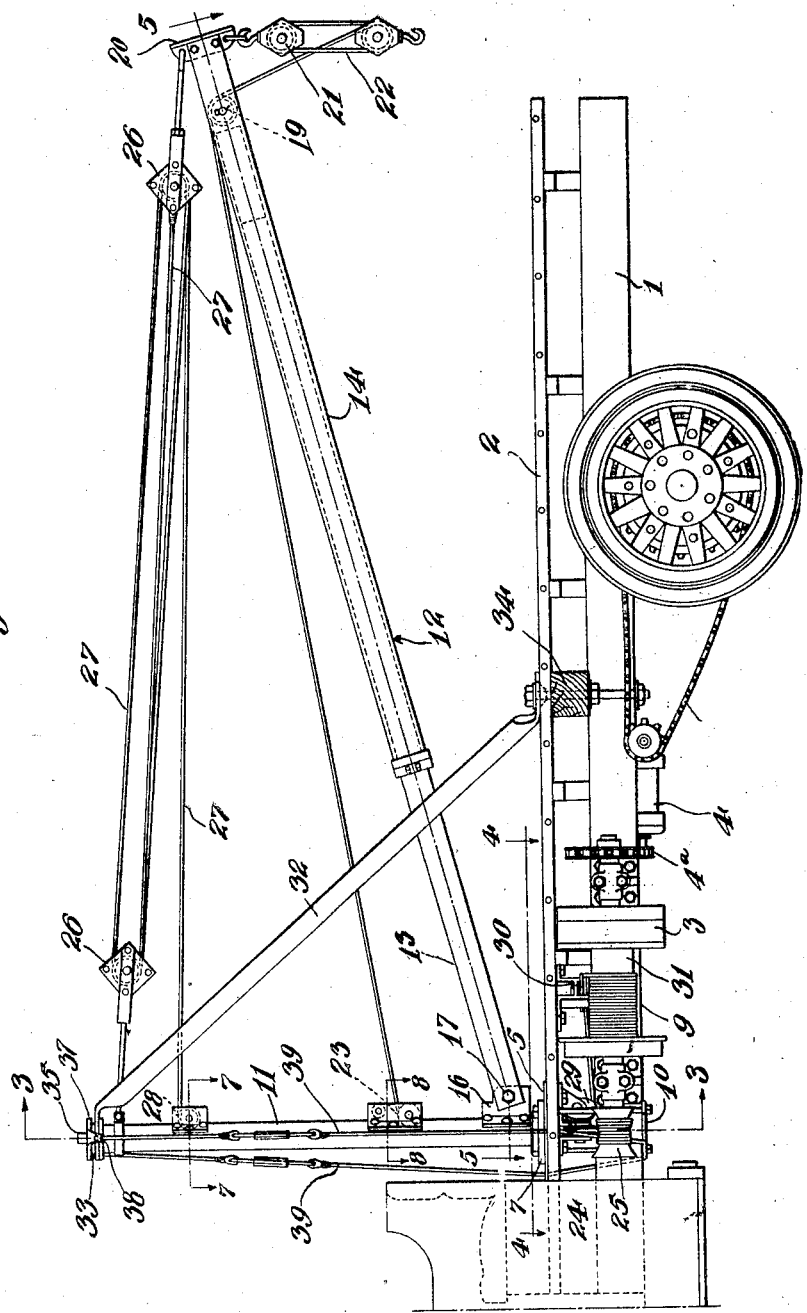

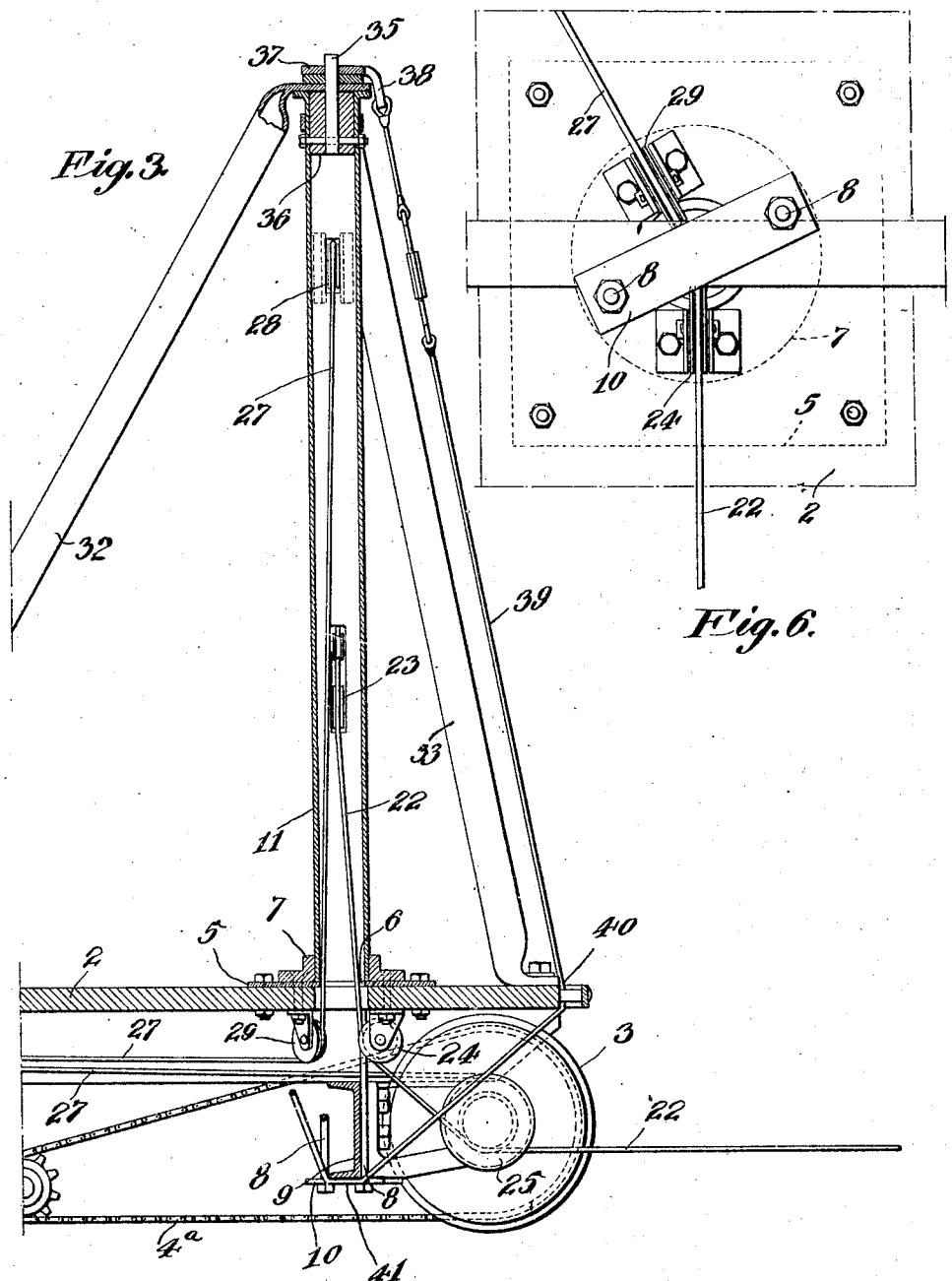

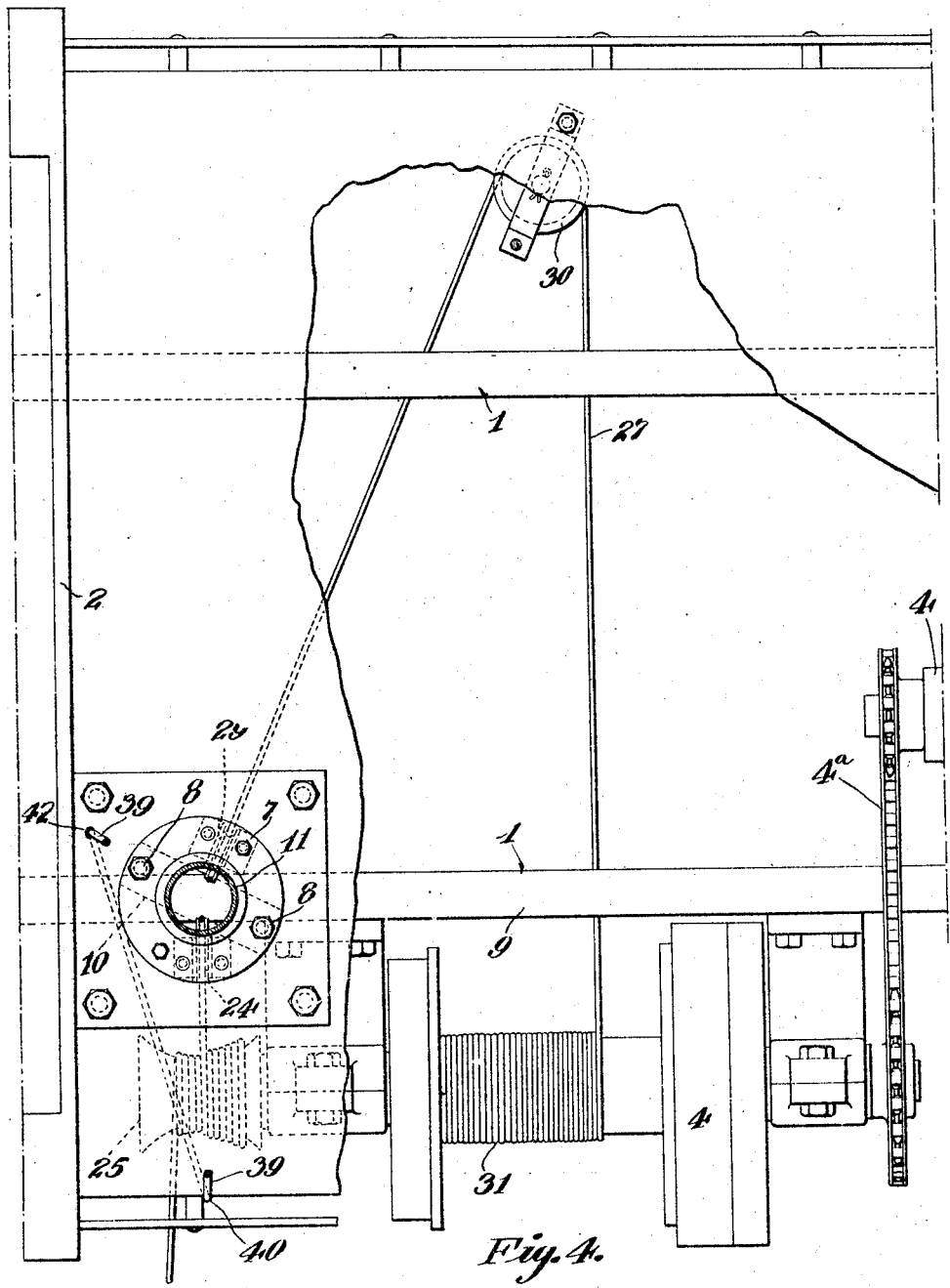

Patented June 14, 1927.

1,632,329

UNITED STATES PATENT OFFICE.

FRANK W. HAKE, OF PHILADELPHIA, PENNSYLVANIA.

DERRICK CRANE.

Application filed January 12, 1925. Serial No. 1,866.

My invention relates to derrick cranes for use on trucking vehicles and the objects are to provide a crane which may be quickly set up and taken down; which will take up but a small part of the loading space on the body of the vehicle, and which may be operated from the ground.

These objects, and other advantageous ends which will be described hereinafter, I attain in the following manner, reference being had to the accompanying drawings in which Figure 1 is a fragmentary side elevation of a trucking vehicle having my derrick crane connected thereto, Figure 2 a plan view of the vehicle shown in Figure 1.

Figure 3 an enlarged fragmentary section on line 3—3 of Figure 1,

Figure 4 an enlarged fragmentary section on line 4—4 of Figure 1, certain of the parts being broken away, Figure 5 a section on line 5—5 of Figure 1, Figure 6 a fragmentary inverted plan view of certain parts of my invention, Figure 7 an enlarged section on line 7—7 of Figure 1, and Figure 8 an enlarged section on line 8—8 of Figure 1.

Referring to the drawings, 1 indicates the chassis and 2 the platform of the body of a trucking vehicle, 3 a hoist of any suitable type mounted on the chassis under the platform and operatively connected with the regular transmission mechanism 4 by a chain 4ª. This hoist is connected by cables with a derrick mounted on the upper side of the platform.

A bearing plate 5 secured around an opening in the platform of the vehicle, has an opening 6 and a ring 7, slightly larger in diameter than the opening, secured thereto. This ring is also secured to the chassis by a pair of bolts 8 passing at opposite sides of a chassis channel 9 and connected to each other by a tie plate 10 bearing against the under side of the channel. A hollow mast 11 in the form of a pipe has its lower edge fitting within ring 7 and bearing on plate 5 so that its opening 6 is substantially flush with the inner side of the pipe to provide ample room to allow the cables to pass from within the mast, through the platform and onto the hoist without danger of the cables engaging the edges of opening 6 or the edges of the pipe mast.

A boom 12 is made from a pair of telescoping sections 13 and 14. Section 13 has a filler block 15 in its outer end. This end is slitted to receive brackets 16, on the mast, and is pivoted thereto by a bolt 17. Section 14 has a filler block 18 in its outer end and is slotted to receive a pulley 19. A bracket 20, preferably made from a pair of angle irons, is secured to the outer end of section 14. The lower end of bracket 20 carries a load hoisting block 21 and a cable 22 which passes over pulley 19 in the boom, a pulley 23 in the mast, downwardly within the mast and under a pulley 24 under the platform onto the spool 25 of the hoist. The upper end of bracket 20 is connected with the mast by pulley blocks 26 and a boom raising cable 27 which passes over a pulley 28 on the mast, downwardly within the mast and around pulleys 29 and 30 onto a drum 31 of hoist 3.

Mast 11 is rigidly held in position by a pair of legs 32 and 33. Leg 32 has its lower end connected to the platform and to a beam 34 secured to the chassis under the platform. The lower end of leg 33 is secured to the platform. The upper ends of legs 32 and 33 fit over a pin 35 secured within a filler block 36 secured in the upper end of the pipe mast. The upper ends of the legs are held on this pin by a connecting plate 37 fitting over the pin and having lugs 38 connected to guy wires 39 passing around the platform at 40, under the channel chassis 9 at 41 and through the platform at 42.

To take down the derrick, boom 12 is lowered onto the platform, guy wires 39 disconnected and plate 37 lifted off pin 35. Legs 32 and 33 are then disconnected from the platform and lifted off pin 35. The pipe mast may then be lifted out of ring 7 and swung on the bolt 17 to lie alongside the boom. The legs may be placed alongside the boom on the platform. The whole derrick when knocked down may be placed in small space on any part of the platform. When the derrick is set up, it is rigid and has a high lifting capacity.

By mounting the hoist on the chassis under the body, heavy loads may be lifted without danger of the hoist being pulled from its foundation. The hoist is out of the way, may be controlled from the ground, and does not occupy loading space on the platform of the vehicle.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A derrick adapted to operate on the platform of a truck in which a hoist is mounted beneath the platform, said derrick having a pipe mast with its lower end rotatably and removably mounted on the platform; a boom associated with the mast; a stiff leg secured to the platform; a second stiff leg secured to the platform and to a support secured to the chassis of the truck and spaced from the first mentioned leg; means rotatably connecting the upper end of the pipe to the legs; and means adapted to be controlled by the hoist beneath the platform for raising said boom and for causing said boom to lift a load.

2. A derrick adapted to be mounted in combination with the platform and chassis of a truck, having a bearing plate adapted to be secured to the platform and having an opening; a ring secured to the plate around the opening; a pipe having its lower end removably mounted on the plate within the ring; a stiff leg adapted to be secured to the platform; a second stiff leg adapted to be fastened through the platform to means secured to the chassis; means for connecting the upper end of the pipe to the legs; a boom swingable vertically on the pipe; and means adapted to be operatively connected to a hoist for controlling said boom.

3. A derrick adapted to operate on a platform in combination with a hoist mounted beneath the platform having a bearing plate with an opening therein secured to the platform; a ring disposed around the opening; means passing through the plate and the platform for securing the ring; a mast rotatably and removably mounted on the plate within the ring; a stiff leg secured to the platform; a second leg secured to the platform and spaced from the first mentioned leg; means rotatably connecting the mast to the legs; a boom on the mast and means passing through the mast and the opening of the bearing plate for controlling the boom.

4. A derrick adapted to operate with the platform and chassis of a vehicle having a mast rotatably and removably mounted on the platform; a stiff leg secured to the platform, a second stiff leg secured to the platform and through a supporting beam to the chassis and spaced from the first mentioned leg; means rotatably connecting the mast to the legs; guy wires connecting with the chassis and the upper end of the mast; a boom swingable on the mast; means adapted to be connected with a hoist positioned in a plane lower than the bottom of the mast for controlling cables passing through the mast and to the boom.

5. A derrick rotatably and removably mounted on the platform of a vehicle having a mast positioned on a bearing plate; a ring surrounding said mast and resting on the bearing plate; means passing through the plate and the platform for securing the ring to the chassis of the vehicle; a plurality of stiff legs secured to the platform; means including a pin on the upper end of the mast, said pin passing through the ends of the legs; guy wires connected with the chassis and the pin for holding the mast on the platform; and means adapted to be connected to a hoist on the chassis whereby a plurality of cables from the boom may be passed through the mast and plate without interfering with each other or chafing to be controlled by the hoist.

6. A derrick having a pipe rotatably and removably mounted near the front end of a platform; a stiff leg secured to the platform near one edge thereof; a second stiff leg secured to the platform near the adjacent edge theerof; means including a vertical pin secured to the upper end of the pipe, said pin passing through the upper end of the legs; means connected with the pin and the platform for holding the pipe on the platform; a boom associated with the pipe and means for rotating the one about the other; means adapted to be connected to a hoist whereby a cable on said boom may be passed through the derrick to said hoist without coming in contact with the inner walls of the derrick, and means for dismantling said derrick and boom by demounting the stiff legs.

In testimony whereof I have signed my name to this specification.

FRANK W. HAKE.